United States Patent
Chen (10) Patent No.: US 8,616,647 B2
(45) Date of Patent: Dec. 31, 2013

(54) INFANT CARRYING APPARATUS PROVIDED WITH A RELEASE ACTUATOR HAVING A SAFETY LOCK

(75) Inventor: Rui-bin Chen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 374 days.

(21) Appl. No.: 12/967,162

(22) Filed: Dec. 14, 2010

(65) Prior Publication Data

US 2011/0148168 A1 Jun. 23, 2011

(30) Foreign Application Priority Data

Dec. 18, 2009 (CN) .......................... 2009 1 0262454

(51) Int. Cl.
*B60N 2/02* (2006.01)
*B60N 2/22* (2006.01)
*B62B 9/00* (2006.01)

(52) U.S. Cl.
USPC .................... 297/364; 297/376; 280/47.38

(58) Field of Classification Search
USPC ............... 297/354.12, 354.13, 376, 374, 364; 280/47.4, 647, 650, 640, 47.38
See application file for complete search history.

(56) References Cited

U.S. PATENT DOCUMENTS

| | | | |
|---|---|---|---|
| 4,832,361 A | 5/1989 | Nakao et al. | |
| 5,246,272 A * | 9/1993 | Kato et al. | 297/364 |
| 5,524,503 A * | 6/1996 | Ishikura | 74/501.6 |
| 6,116,624 A | 9/2000 | Hu | |
| 6,129,373 A * | 10/2000 | Cheng | 280/647 |
| 6,302,613 B1 * | 10/2001 | Lan | 403/102 |
| 6,478,328 B1 * | 11/2002 | Yeh et al. | 280/650 |
| 6,508,605 B1 | 1/2003 | Cheng | |
| 6,530,591 B2 | 3/2003 | Huang | |
| 6,824,161 B2 | 11/2004 | Iwata | |
| 6,830,254 B2 | 12/2004 | Lan | |
| 6,851,700 B2 * | 2/2005 | Yoshie et al. | 280/642 |
| 6,951,342 B2 | 10/2005 | Lan | |
| 7,021,650 B2 | 4/2006 | Chen | |
| 7,066,542 B2 * | 6/2006 | Wang | 297/376 |
| 7,273,225 B2 | 9/2007 | Yeh | |
| 7,401,803 B1 | 7/2008 | Lai | |
| 7,513,512 B2 | 4/2009 | Yoshie et al. | |
| 8,215,661 B2 * | 7/2012 | van Dijk | 280/642 |
| 2002/0121766 A1 * | 9/2002 | Suzuki | 280/647 |
| 2003/0168833 A1 | 9/2003 | Chen | |
| 2005/0029775 A1 | 2/2005 | Chen | |

FOREIGN PATENT DOCUMENTS

| | | |
|---|---|---|
| CN | 2452387 Y | 10/2001 |
| CN | 2752131 Y | 1/2006 |
| CN | 2787534 Y | 6/2006 |

(Continued)

*Primary Examiner* — Milton Nelson, Jr.
(74) *Attorney, Agent, or Firm* — David I. Roche; Baker & McKenzie LLP (57) ABSTRACT

A release actuator can comprise a support element, a latch mechanism, a release button movably assembled with the support element, a transmission element connecting the latch mechanism with the release button, and a safety latch key disposed adjacent to the release button. The release button can be movable parallel to a first axis for driving unlocking operation of the latch mechanism. The safety latch key and the release button are assembled so as to be movable relative to each other parallel to a second axis for either blocking or unblocking movements of the release button parallel to the first axis. Moreover, one embodiment of an infant carrying apparatus is also described.

17 Claims, 8 Drawing Sheets

(56) References Cited

FOREIGN PATENT DOCUMENTS

| | | |
|---|---|---|
| CN | 2841450 Y | 11/2006 |
| CN | 1319796 C | 6/2007 |
| CN | 2922646 Y | 7/2007 |
| CN | 201040497 Y | 3/2008 |
| CN | 201077473 Y | 6/2008 |
| CN | 201154720 Y | 11/2008 |
| CN | 101553391 A | 10/2009 |
| CN | 201334043 Y | 10/2009 |
| CN | 101602375 A | 12/2009 |
| EP | 1693277 A2 | 8/2006 |
| EP | 1970284 A2 | 9/2008 |
| EP | 2135794 A1 | 12/2009 |
| TW | 586503 | 1/1992 |
| TW | 288269 M | 9/1996 |
| TW | 275137 M | 9/2005 |

* cited by examiner

INFANT CARRYING APPARATUS PROVIDED WITH A RELEASE ACTUATOR HAVING A SAFETY LOCK

CROSS-REFERENCE TO RELATED APPLICATION

This application claims priority to China Patent Application No. 200910262454.5 filed on Dec. 18, 2009.

BACKGROUND

1. Field of the Invention

The present invention relates to an infant carrying apparatus, and more particularly to an infant carrying apparatus provided with a release actuator having a safety lock feature.

2. Description of the Related Art

A stroller apparatus typically comprises a support frame provided with multiple wheels, a seat and a backrest. For providing optimal comfort to the child in a seating position, the backrest may usually be adjusted to different inclinations. For this purpose, the backrest is pivotally assembled with the seat, and a latch mechanism can be provided for holding the backrest in place. When the adult wants to change the position of the backrest, a release actuator provided on a transverse portion of the backrest can be operated to unlock the latch mechanism. After the backrest is adjusted to the desired position, the latch mechanism can recover a locked state for holding the backrest in position.

Practically, it may happen that the release actuator is accidentally operated owing to the absence of safety features. As a result, the backrest may inadvertently unlock and rotate while the child is seated, which raise safety issues.

Therefore, there is a need for an improved release actuator that is safer in use and address at least the foregoing issues.

SUMMARY

The present application describes an infant carrying apparatus that is provided with a release actuator featuring a safety lock. The safety lock can be operated in a convenient manner, and effectively prevent accidental operation of the release actuator.

In one embodiment, the release actuator can comprise a support element, a transmission element, having first and second distal ends, a latch mechanism coupled with the second distal end of the transmission element, a release button coupled with the first distal end of the transmission element and movably assembled with the support element, and a safety latch key disposed adjacent to the release button. In particular, the release button can be movable parallel to a first axis for driving the latch mechanism via the transmission element. The safety latch key and the release button are assembled so as to be movable relative to each other parallel to a second axis for switching the release actuator between a locked state and an unlocked state, wherein the safety latch key blocks the release button from moving parallel to the first axis when the release actuator is in the locked state, and the safety latch key allows the release button to move parallel to the first axis when the release actuator is in the unlocked state.

In other embodiments, the present application describes an infant carrying apparatus which comprises a support frame, a backrest including at least a side segment and a transverse segment, and a backrest adjusting mechanism provided between the side segment of the backrest and the support frame, wherein the backrest adjusting mechanism comprises a latch device and positioning fixture, the backrest being operable to rotate relative to the positioning fixture and lock with the positioning fixture at a desired inclination via the latch device. In addition, the infant carrying apparatus also comprises a transmission element having first and second distal ends, wherein the second distal end is coupled with the latch device, a release button movably assembled with the transverse segment of the backrest and coupled with the first distal end of the transmission element, and a safety latch key disposed adjacent to the release button. More specifically, the release button can be movable parallel to a first axis for driving the latch device to unlock via the transmission element, and the safety latch key and the release button are assembled so as to be movable relative to each other parallel to a second axis for engaging the safety latch key with the release button, thereby blocking the release button from driving unlocking operation of the latch device.

DETAILED DESCRIPTION OF THE EMBODIMENTS

Figure 1:
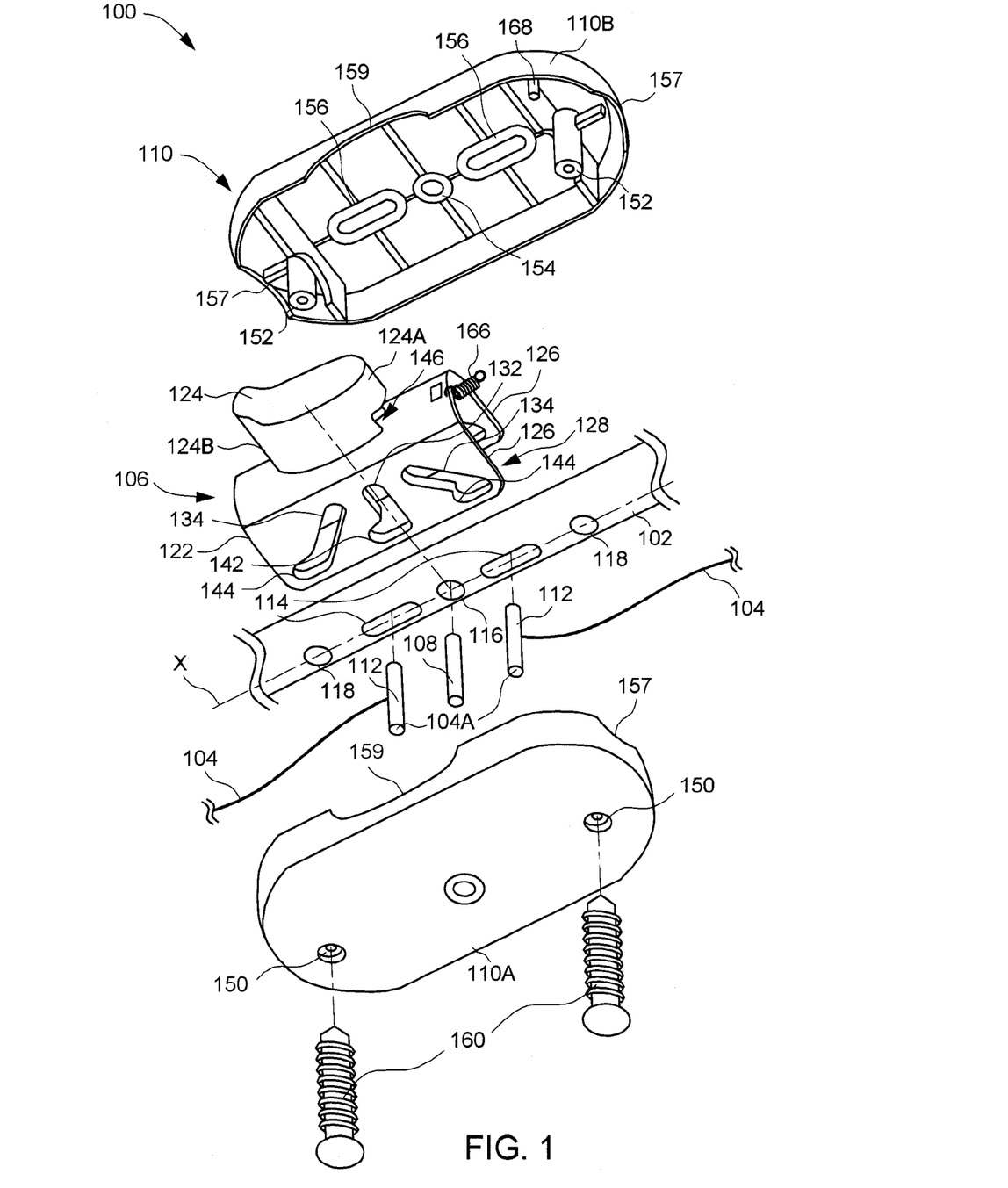
FIG. 1 is an exploded view illustrating one embodiment of a release actuator provided with a safety lock feature.
Figure 2:
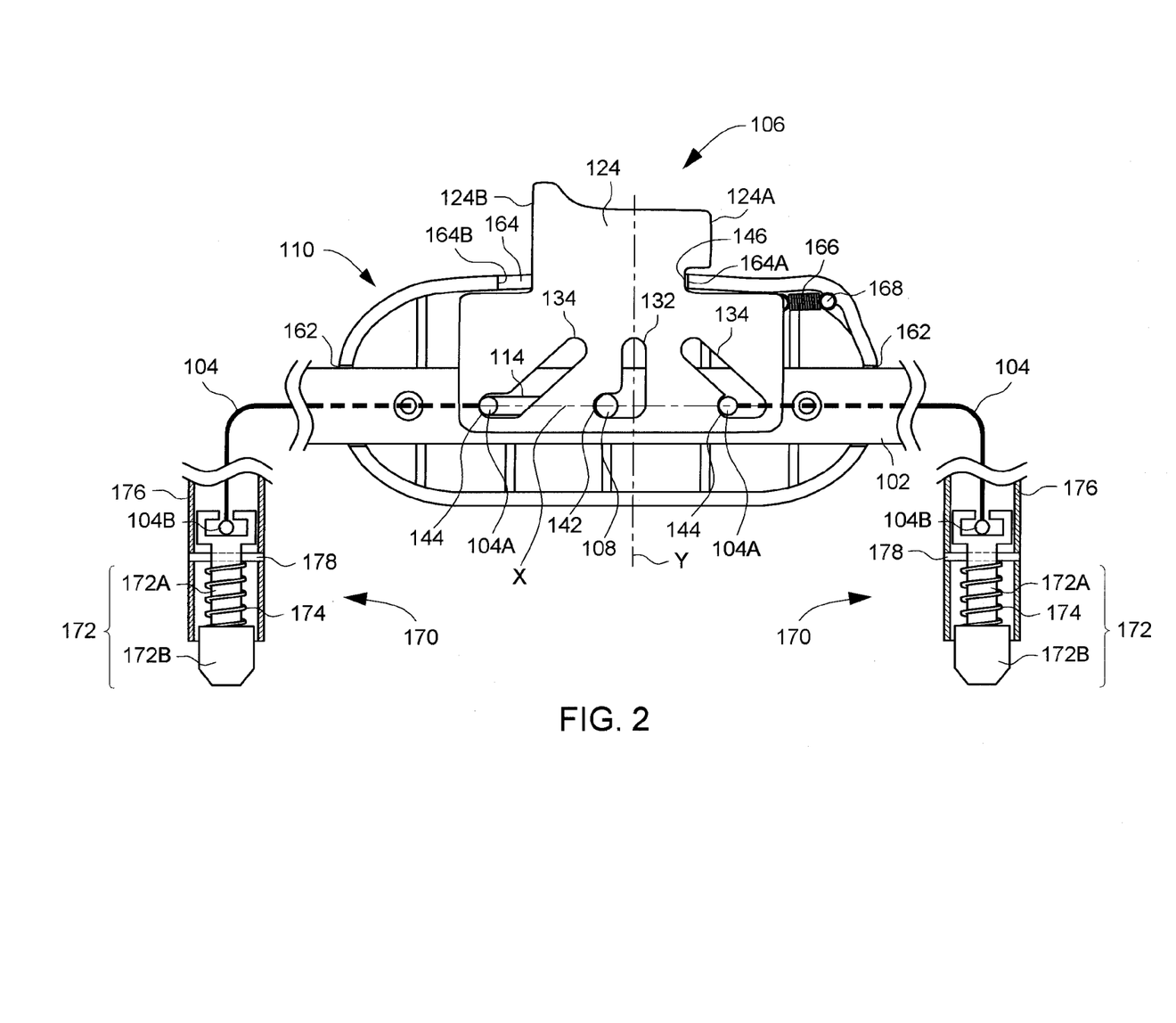
FIG. 2 is a side view of the release actuator shown in FIG. 1.

FIGS. 1 and 2 are respectively exploded and side views illustrating one embodiment of a release actuator 100 provided with a safety lock feature. The release actuator 100 can be assembled with a support element 102, wherein the support element 102 can be a tubular element. The release actuator 100 can comprise two transmission elements 104, a release button 106 connected with the two transmission elements 104, a safety latch key 108, and a housing 110 for movably positioning the release button 106 on the support element 102. In one embodiment, the housing 110 can be formed from the assembly of first and second casing bodies 110A and 110B.

Each of the transmission elements 104, which can be cables or like flexible elongated elements, can include first and second ends 104A and 104B respectively provided with a pin 112. The transmission elements 104 are assembled along an inner side of the support element 102. The first end 104A of each transmission element 104 can respectively engage for translational displacement through a guide slot 114 that is formed through the support element 102 generally parallel to an axis X. The support element 102 can include a hole 116 that is located on the axis X between the two guide slots 114, and two holes 118 (as better shown in FIG. 1) respectively located on opposite outer sides of the two guide slots 114.

The safety latch key 108 can be formed as a pin fixedly secured through the hole 116 of the support element 102. The housing 110 can be affixed on the support element 102 and secured therewith via fastener elements 160 engaging through the holes 118.

Referring again to FIGS. 1 and 2, the release button 106 can include a coupling base 122 and an operation part 124 protruding from the coupling base 122. The coupling base 122 can have a saddle shape with two parallel sidewalls 126 spaced apart from each other, and a recessed region 128 delimited between the two sidewalls 126.

Each of the two sidewalls 126 can centrally include a guide slot 132 and two biasing slots 134. The guide slot 132 extends generally parallel to an axis Y substantially perpendicular to the axis X. The two biasing slots 134 are arranged at two opposite sides of the guide slot 132 inclined an angle relative to the axis Y. In addition, each of the sidewalls 126 can include locking slots 142 and 144, the locking slots 142 and 144 extending generally parallel to the axis X. The first locking slot 142 can communicate and join with an end portion of the guide slot 132, whereas the second locking slots 144 can respectively communicate and join with end portions of the biasing slots 134.

The operation part 124 protrudes from an upper surface of the coupling base 122, and has first and second side surfaces 124A and 124B opposite to each other, the first side surface 124A having a recess 146 located proximate to the coupling base 122. The release button 106 can be assembled with the support element 102 in a movable manner, and is restrainedly positioned therewith via the housing 110 and the safety latch key 108.

The first casing body 110A of the housing 110 can include a plurality of holes 150, whereas an inner surface of the second casing body 110B can include a plurality of protruding posts 152 having inner threaded holes that are located corresponding to the holes 150. Moreover, the second casing body 110B can also include a hole 154, and two elongated openings 156 that are respectively arranged at two opposite sides of the hole 154 and extend parallel to the axis X. Each of the first and second casing bodies 110A and 110B has corresponding recessed regions 157 at two opposite side edge portions thereof for passage of the support element 102, and corresponding recessed regions 159 for passage of the operation part 124 of the release button 106.

For assembling the release actuator 100, the release button 106 can be disposed such that the support element 102 is received in the recessed region 128, whereby the coupling base 122 is in a saddling position on the support element 102. The release button 106 is thereby assembled on the support element 102 in a movable manner along the axes X and Y. The first end 104A of each transmission element 104 is respectively engaged through the corresponding guide slot 114 of the support element 102 and the corresponding biasing slot 134 of the release button 106 overlapping with the guider slot 114. As a result, the transmission element 104 is mounted in a movable manner relative to the release button 106 and support element 102. In addition, the safety latch key 108 can be fixedly secured through the hole 154 of the second casing body 110B and movably engaged with the guide slot 132 of the release button 106. After the release button 106 is assembled with the transmission elements 104 and the safety latch key 108 on the support element 102, the posts 152 of the second casing body 110B can be respectively engaged in alignment with the holes 118 of the support element 102 and the holes 150 of the first casing body 110A. Fasteners 160 (e.g., screw fasteners) can be then engaged through the holes 150 and the posts 152 for locking the first and second casing bodies 110A and 110B with the support element 102. Once the assembly of the housing 110 is completed, the support element 102 can pass through openings 162 respectively enclosed by the recessed regions 157 of the first and second casing bodies 110A and 110B. As for the release button 106, the coupling base 122 is restrained to move in the interior of the housing 110, whereas the operation part 124 protrudes through an opening 164 of the housing 110 having a rim formed by the corresponding recessed regions 159 of the first and second casing bodies 110A and 110B.

In addition, the release actuator 100 can also include a spring element 166 disposed in the housing 110 and coupled with the release button 106. More specifically, the spring element 166 can have a first end connected with the coupling base 122 of the release button 106, and a second end connected with a protuberance 168 formed on an inner surface of the second casing body 110B adjacent to a side of the coupling base 122. As shown in FIG. 2, the release actuator 100 can be thereby connected with two remote latch mechanisms 170 via the transmission elements 104.

According to one embodiment, each of the latch mechanisms 170 can include a latch element 172 and a spring element 174. The latch element 172 can be movably assembled through an interior of a tubular element 176, which may be connected with or formed as an extension of the support element 102 to form a portion of an entire support frame. As shown, the latch element 172 can include a stem 172A, and an engaging end 172B joined with a lower side of the stem 172A. The stem 172A may be connected with the second end 104B of one transmission element 104. A fixed key 178 (e.g., pin or rivet) can be engaged through elongated slots (not shown) respectively provided through the tubular element 176 and the stem 172A for delimiting a range of translational displacement of the latch element 172 in the tubular element 176.

The spring element 174 can be assembled around the stem 172A for biasing the latch element 172 to a locking state. More specifically, the spring element 174 can have a first end connected with a side surface of the engaging end 172B, and a second end connected with the fixed key 178. Owing to the spring force applied by the spring element 174, the latch element 172 can be biased toward a locking position, as shown in FIG. 2. For unlocking the latch mechanisms 170, the release actuator 100 can be operated so as to drive each latch element 172 to retract toward the interior of the tubular element 176, as shown in FIG. 4.

Figure 3:
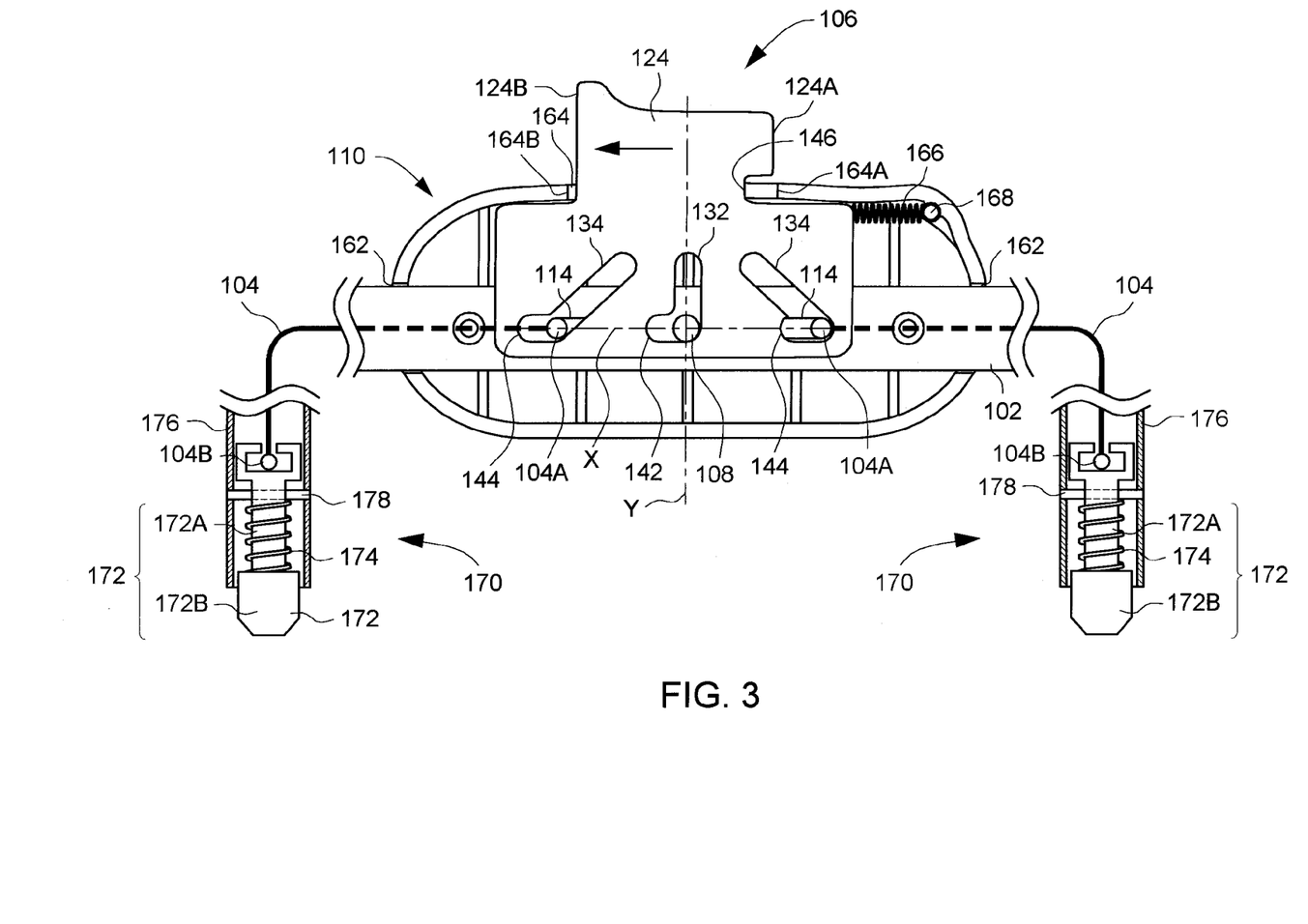
FIG. 3 is a schematic view illustrating the release actuator of FIG. 1 in an unlocked state.
Figure 4:
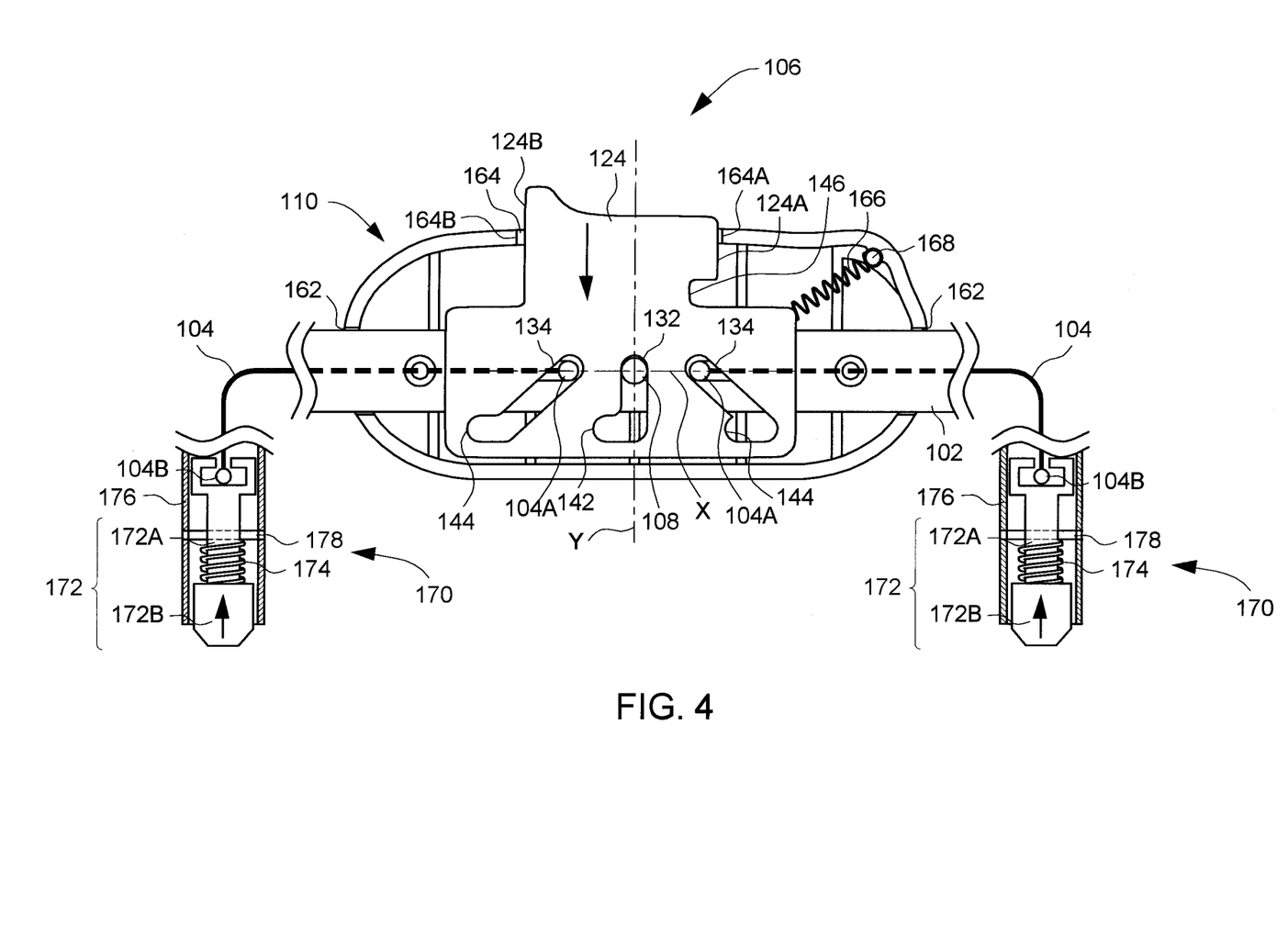
FIG. 4 is a schematic view illustrating the unlocked release actuator driving a latch mechanism.

Exemplary operation of the release actuator 100 is described hereafter with reference to FIGS. 2, 3 and 4. In particular, FIGS. 2 and 3 respectively show the release actuator 100 in locked and unlocked states, and FIG. 4 shows the release actuator 100 driving the latch mechanisms 170 after it is unlocked. With reference to FIG. 2, the spring element 166 can bias the release button 106 to a locking position. In this position, the safety latch key 108 is located in the first locking slot 142, the first distal end 104A of each transmission element 104 is respectively located in the corresponding second locking slot 144, and a first edge 164A of the opening 164 is engaged in the recess 146 of the operation part 124. The release button 106 can be thereby blocked from moving parallel to the axis Y toward the interior of the housing 110. Accordingly, the release button 106 can remain locked against any depressing action that may be inadvertently applied on the operation part 124, such that the latch mechanisms 170 can be kept in locked engagement in a safe manner.

Referring to FIG. 3, when a user wants to disengage and unlock the release mechanisms 170, the operation part 124 is first pulled to drive displacement of the release button 106 parallel to the axis X for disengaging the recess 146 from the edge 164A of the opening 164. The release button 106 thereby slides relative to the support element 102 to load the spring element 166, and the safety latch key 108 and first distal ends 104A of the transmission element 104 leave their respective engagement with the locking slots 142 and 144. Accordingly, the release actuator 100 can be turned to an unlocked position. In one embodiment, the release actuator 100 can reach the unlocked position when the second side surface 124B of the operation part 124 contacts with a second edge 164B of the opening 164 opposite to the edge 164A.

Referring to FIG. 4, the unlocked release button 106 can then be depressed to slide parallel to the axis Y toward the interior of the housing 110, guided by the respective interaction between the opening 164 and the guide slot 132 of the release button 106 with the operation part 124 and the safety latch key 108. As the release button 106 moves, the biasing slots 134 are displaced the transmission elements 104 to slide along the guide slots 114. Being pulled in movement, the transmission elements 104 in turn can drive each latch element 172 to retract toward the interior of the corresponding tubular element 176 to unlock the latch mechanisms 170.

Once the pushing force is removed, the spring action exerted by the spring element 166 can drive the release button 106 to move parallel to the axis Y toward the outside of the housing 110, and urge the first side surface 124A of the operation part 124 to contact with the first edge 164A of the opening 164. When the recess 146 of the operation part 124 reaches the first edge 164A of the opening 164, the safety latch key 108 is located approximately adjacent to the joining region between the guide slot 132 and the first locking slot 142, while the first distal ends 104A of the transmission elements 104 are located approximately adjacent to the joining regions between the biasing slots 134 and the locking slots 144, respectively. Because the first edge 164A of the opening 164 no longer contacts with the first side surface 124A of the operation part 124, the continuous spring action exerted by the spring element 166 can then drive the release button 106 to move parallel to the axis X. As a result, the safety latch key 108 becomes engaged in the first locking slot 142, the first distal ends 104A of the transmission elements 104 are positioned in the second locking slots 144, and the recess 146 of the operation part 124 and the first edge 164A of the opening 164 engage with each other. These engagement positions can effectively block all displacements of the release button 106 parallel to the axis Y. As a result, the release actuator 100 can recover the locking position, and the latch mechanisms 170 can be switched to the locked state.

With the aforementioned safety lock, the release actuator 100 requires two directional movements to unlock, which can effectively prevent accidental unlocking of the latch mechanisms 170. It will be appreciated that multiple variations of the embodiment described above may be applicable as described hereafter.

Figure 5:
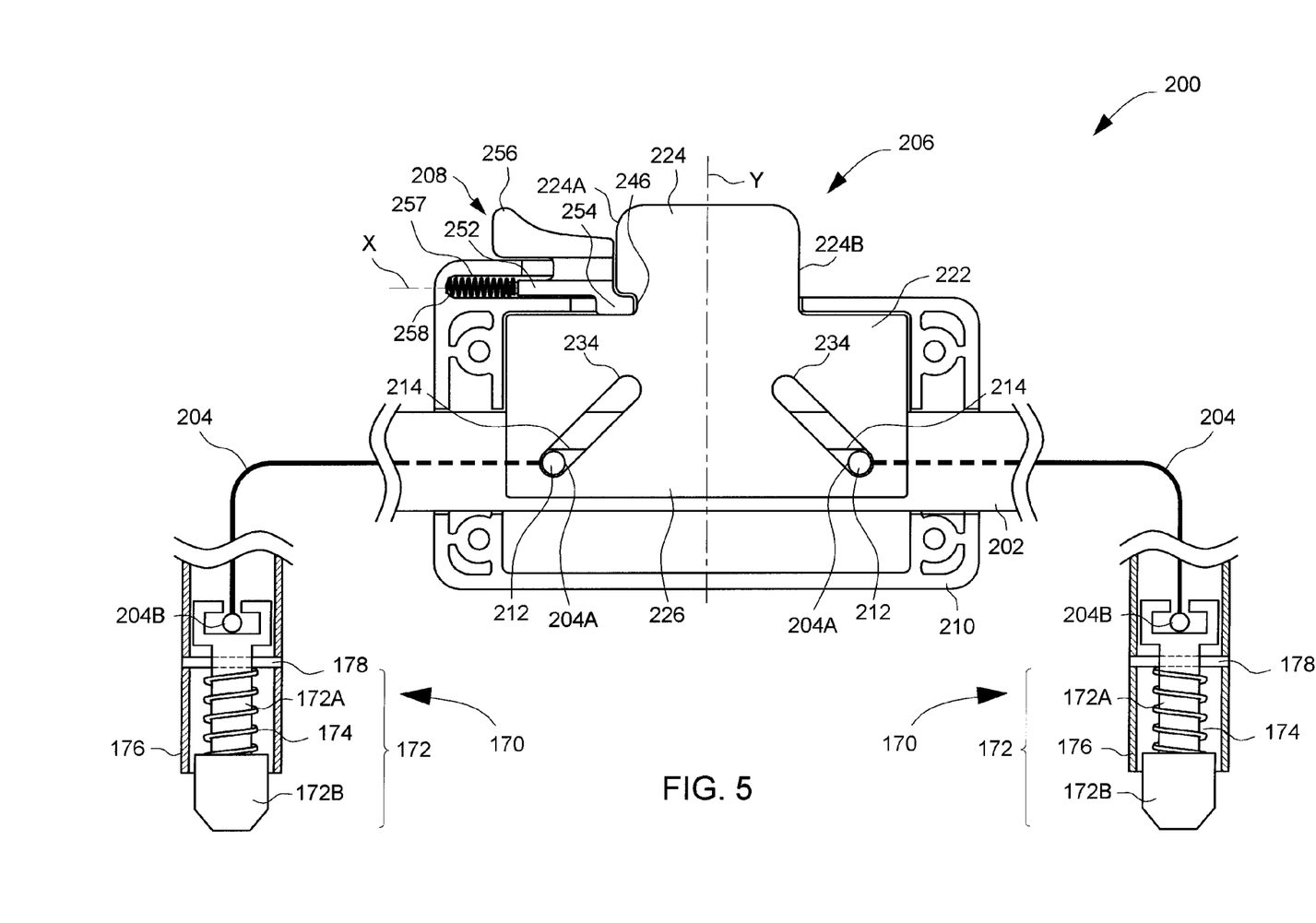
FIG. 5 is a schematic view illustrating another embodiment of a release actuator provided with a safety lock feature.

FIG. 5 is a schematic view illustrating another release actuator 200. Likewise, the release actuator 200 can be assembled on a support element 202, which can be a tubular element. The release actuator 200 can include two transmission elements 204, a release button 206 connected with the transmission elements 204, a housing 210 for mounting the release button 206 on the support element 202, and a safety latch key 208 movably assembled with the housing 210.

The transmission elements 204 can be cable elements having first and second distal ends 204A and 204B respectively provided with pins 212. The transmission elements 204 can be assembled along the interior of the support element 202. In particular, the first distal ends 204A of the transmission elements 204 can be respectively engaged with corresponding guide slots 214 that are formed in the support element 202 parallel to the axis X. The second distal ends 204B can be coupled with the latch mechanisms 170.

Referring to FIG. 5, the release button 206 can comprise a U-shaped base 222, and an operation part 224 joined with an upper portion of the base 222. The base 222 of the release button 206 can be movably assembled on the support element 202, such that the release button 206 can be operable to move parallel to the axis Y substantially perpendicular to the axis X. The base 222 can also have opposite sidewalls 226 respectively provided with two generally symmetrical biasing slots 234 that are inclined an angle relative to the axis Y.

The operation part 224 has first and second side surfaces 224A and 224B, the first side surface 224A including a recess 246 at a location adjacent to the base 222. The release button 206 can be assembled so as to only slide parallel to the axis Y, whereas the safety latch key 208 is assembled to be movable parallel to the axis X relative to the release button 206 for locking and unlocking the release button 206.

As shown in FIG. 5, the safety latch key 208 can be movably assembled with the housing 210 at a side facing the first side surface 224A of the release button 206. The safety latch key 208 can include an extension 252, a protuberance 254 projecting opposite to the extension 252, and a protruding knob 256. The extension 252 of the safety latch key 208 can be mounted through a guide slot 257 of the housing 210 and is coupled with a spring element 258. The spring element 258 can have a first end connected with the extension 252, and a second end coupled with an inner sidewall of the guide slot 257. The safety latch key 208 can move linearly parallel to the axis X relative to the release button 206. In particular, the safety latch key 208 can be operatively moved between a first position engaged with the release button 206, and a second position disengaged from the release button 206.

Figure 6:
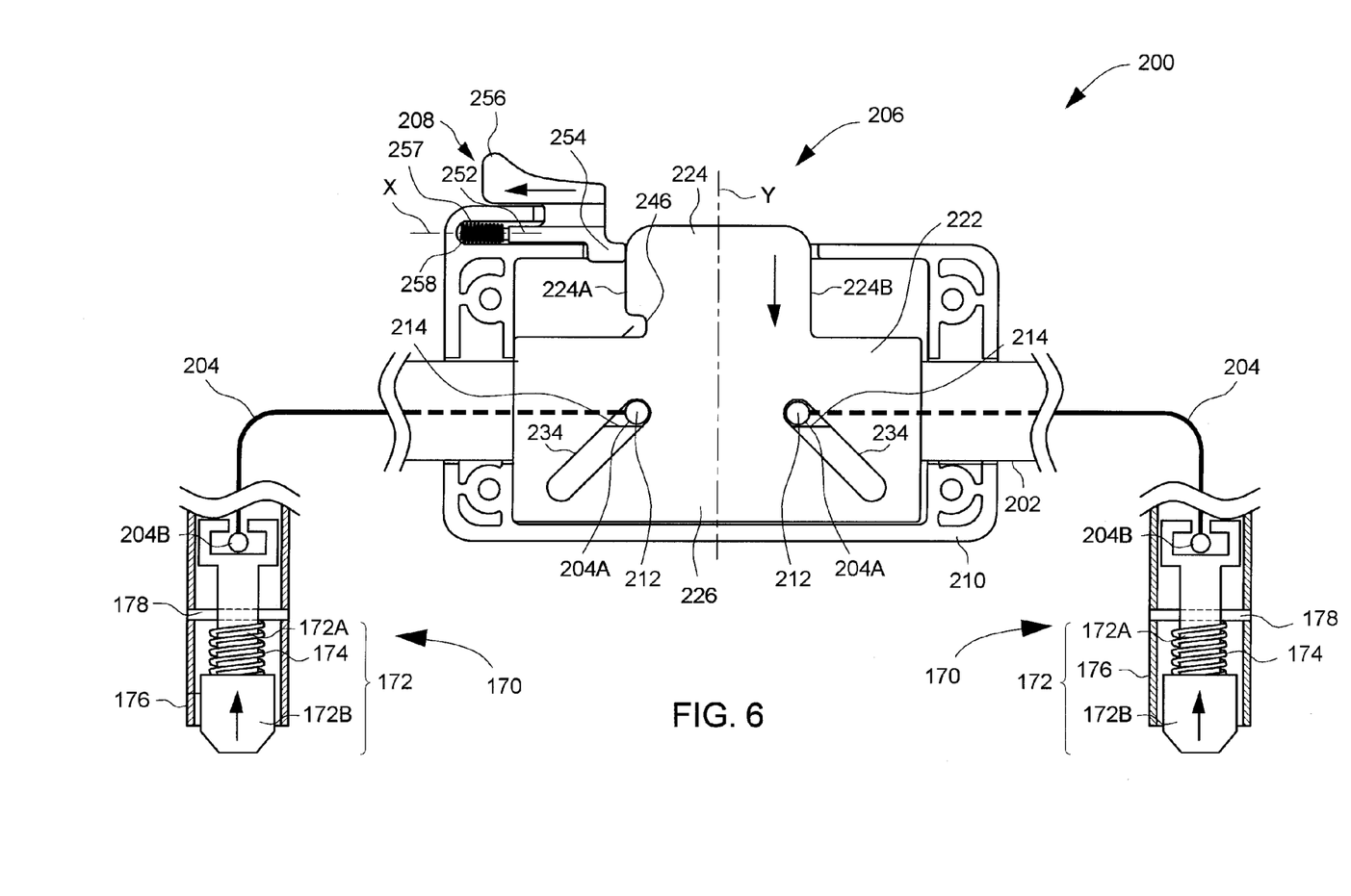
FIG. 6 is a schematic view illustrating the release actuator in an unlocked state and driving a latch mechanism.

Exemplary operation of the release actuator 200 is described hereafter with reference to FIGS. 5 and 6. In FIG. 5, the release actuator 200 is in a locked position. The operation part 224 of the release button 206 extends out of the housing 210, and the spring element 258 biases the safety latch key 208 toward the first side surface 224A of the release button 206. As a result, the protuberance 254 of the safety latch key 208 can engage with the recess 246 of the release button 206 for blocking movement of the release button 206 toward the interior of the housing 210. Moreover, the first ends 204A of the transmission elements 204 are located in regions of the biasing slots 234 that are relatively more distant from each other. Even if a depressing action is applied on the release button 206, the engagement of the safety latch key 208 in this first position can block movement of the release button 206 toward the interior of the housing 210 for disengaging the latch mechanisms 170. Accordingly, the release actuator 200 can be kept in the locked state, and the latch mechanisms 170 can be in locking engagement.

Referring to FIG. 6, when a user wants to disengage and unlock the release mechanisms 170, the knob 256 is first pulled to drive the safety latch key 208 to move away from the release button 206 parallel to the axis X. The release actuator 200 can be thereby switched to the unlocked position once the safety latch key 208 reaches a second position where the protuberance 254 fully disengages from the recess 246. Subsequently, the unlocked release button 206 can be then depressed and displaced parallel to the axis Y toward the interior of the housing 210. As the unlocked release button 206 moves, the safety latch key 208 can rest against the first side surface 224A of the release button 206 under the spring force applied by the spring element 258. Therefore, a user does not need to continuously exert a pulling action on the safety latch key 208 for maintaining the unlocked state of the release actuator 200. In addition, the biasing slots 234 are displaced relative to the corresponding guide slots 214 for driving the first distal ends 204A of the transmission elements 204 to slide along the guide slots 214 toward each other. Being pulled in movement, the transmission elements 204 can accordingly drive each latch element 172 to retract toward the interior of the corresponding tubular element 176 to unlock the latch mechanisms 170.

When the depressing force applied on the release button 206 is removed, the spring element 174 in each of the latch mechanisms 170 can apply a driving force that is transmitted via each transmission element 204 to drive a movement of the release button 206 toward the outside of the housing 210. As the release button 206 moves, the protuberance 254 of the safety latch key 208 contacts with the first side surface 224A of the release button 206. Once the recess 246 comes in alignment with the protuberance 254, the spring element 258 can urge the safety latch key 208 to move parallel to the axis X toward the release button 206. The protuberance 254 of the safety latch key 208 can thereby engage with the recess 246 to block movement of the release button 206. Accordingly, the release actuator 200 can recover the locked state, and the latch mechanisms 170 can be turned to an engagement state.

Figure 7:
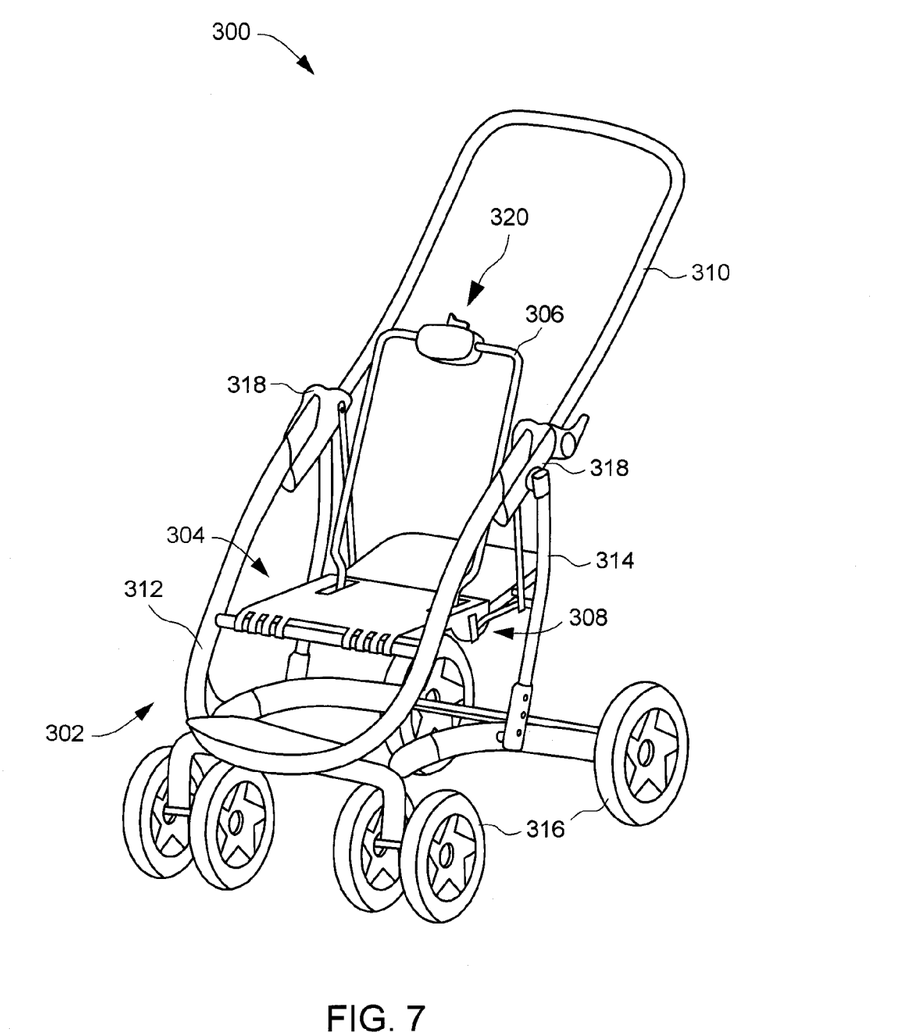
FIG. 7 is a schematic view illustrating one embodiment of an infant carrying apparatus using a release actuator with a safety lock feature.

FIG. 7 is a schematic view illustrating one embodiment of an infant carrying apparatus 300 (e.g., infant stroller) that can use the aforementioned safety lock construction. The infant carrying apparatus 300 can include a support frame 302, a seat 304 assembled with the support frame 302, a backrest 306 pivotally assembled with the seat 304, backrest adjusting mechanisms 308 arranged at left and right sides of the seat 304, and a handle 310. The support frame 302 can include front legs 312, rear legs 314, and a plurality of wheels 316 provided at lower ends of the front and rear legs 312 and 314. The handle 310 can have a generally U-shape formed from the assembly of a single or multiple tubular segments. Left and right upper portions of the front legs 312 can be respectively connected with left and right upper portions of the rear legs 314 and left and right lower extensions of the handle 310 via connector elements 318.

Referring again to FIG. 7, the seat 304 can be mounted between the front legs 312 and the rear legs 314. The backrest 306 can have a generally U-shape including left and right side segments, and a transverse segment connected between the side segments. The backrest adjusting mechanisms 308 can be respectively assembled between the seat 304 and the left and right side segments of the backrest 306. In addition, the transverse segment of the backrest 306 can include a release actuator 320.

Figure 8:
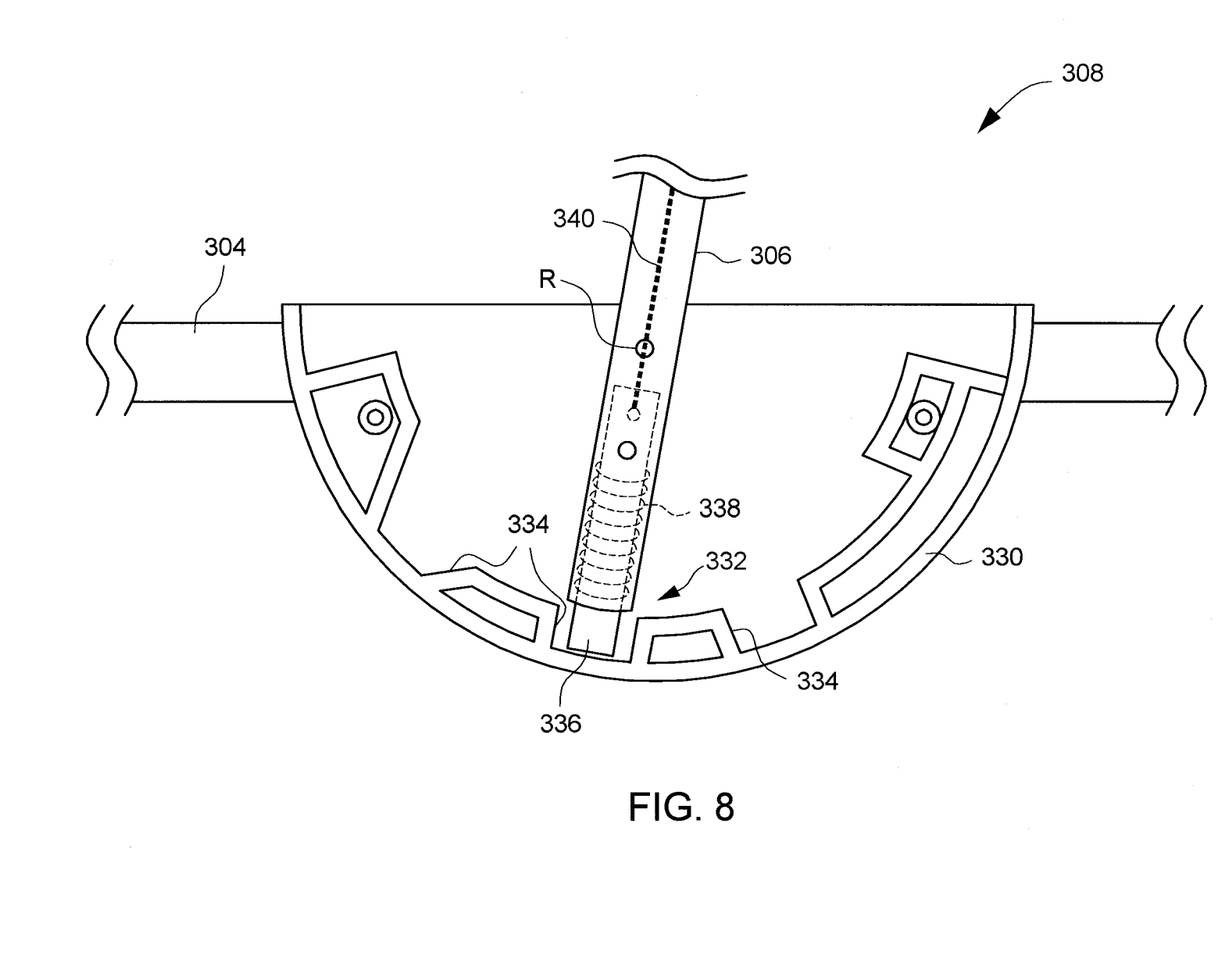
FIG. 8 is a schematic view illustrating one embodiment of a backrest adjusting mechanism implemented in the infant carrying apparatus shown in FIG. 7.

FIG. 8 is an enlarged view illustrating the construction of one backrest adjusting mechanism 308. As shown, the backrest adjusting mechanism 308 can include a positioning fixture 330 and a latch device 332. The positioning fixture 330 can be formed as a housing affixed with the seat 304, and provided with a plurality of locking grooves 334. The latch device 332 can be assembled at a distal end of one side segment of the backrest 306, and have the same structure as the latch mechanism 170 previously described. In particular, the latch device 332 can include a latch element 336 that is movably assembled through the side segment of the backrest 306, and a spring element 338 operable to bias the latch element 336 toward a position in locking engagement with one of the locking grooves 334 for securely holding the backrest 306 at a desired inclination relative to the seat 304.

The release actuator 320 can have a design similar to any of the release actuators (e.g., release actuator 100 or 200) described previously. The release actuator 320 can be connected with each latch device 332 via a transmission element (e.g., cable) for driving unlocking operation of the latch device 332. Accordingly, a user can use one hand for operating the release actuator 320 to disengage the latch element 336 from the locking groove 334. The backrest 306 then can be adjustably rotated about the pivot axis R relative to the positioning fixture 330. Once the backrest 306 reaches the desired inclination, the spring element 338 can bias the latch element 336 to the position in engagement with the corresponding locking groove 334 for locking the backrest 306 in place.

With the aforementioned structures implementing a safety lock feature, the release actuator 320 can be prevented from accidentally driving unlocking operation of the latch device 332, which renders the adjustment of the backrest 306 safer in use. Moreover, the release actuator 320 is easy to operate, allowing adjustment of the backrest 306 with one hand.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrying apparatus comprising:
   a support frame;
   a backrest including at least a side segment and a transverse segment;
   a backrest adjusting mechanism provided between the side segment of the backrest and the support frame, wherein the backrest adjusting mechanism comprises a latch device and a positioning fixture, the backrest being operable to rotate relative to the positioning fixture and lock with the positioning fixture at a desired inclination via the latch device;
   a transmission element having first and second distal ends, wherein the second distal end is coupled with the latch device;
   a release button, movably assembled with the transverse segment of the backrest and coupled with the first distal end of the transmission element, wherein the release button comprises an operation part having a recess, and the release button is movable parallel to a first axis for driving the latch device to unlock via the transmission element;
   a safety latch key disposed adjacent to the release button, wherein the safety latch key and the release button are assembled so as to be movable relative to each other parallel to a second axis for engaging the safety latch key with the release button, thereby blocking the release button from driving unlocking operation of the latch device; and
   a housing for movably assembling the release button with the transverse segment of the backrest, the housing including an opening through which is passed the operation part, the opening having a first edge that engages with the recess of the operation part when the release button is engaged with the safety latch key.

2. The infant carrying apparatus according to claim 1, wherein the second axis is substantially perpendicular to the first axis.

3. The infant carrying apparatus according to claim 1, wherein the transmission element is assembled along an interior of the backrest.

4. The infant carrying apparatus according to claim 1, wherein the release button further comprises a biasing slot, and a locking slot communicating with the biasing slot, wherein the first distal end of the transmission element is movably engaged with the biasing slot, and is displaced to engage with the locking slot when the safety latch key is engaged with the release button.

5. The infant carrying apparatus according to claim 4, wherein the biasing slot extends at an angle relative to the first axis.

6. The infant carrying apparatus according to claim 1, wherein the safety latch key is affixed with the transverse segment of the backrest, the release button comprises a locking slot and is movable parallel to the second axis relative to the safety latch key, wherein the safety latch key is engaged with the locking slot for blocking movement of the release button parallel to the first axis.

7. The infant carrying apparatus according to claim 6, wherein the release button further comprises a guide slot extending parallel to the first axis, the guide slot communicating with the locking slot.

8. The infant carrying apparatus according to claim 6, wherein the release button is connected with a spring element that is operable to bias the release button toward a position engaging the safety latch key with the first locking slot.

9. An infant carrying apparatus comprising:
a support frame;
a movable frame including at least a first segment and a second segment;
an adjustment mechanism assembled with the first segment and the support frame, wherein the adjustment mechanism comprises a latch device and a positioning fixture, the movable frame being operable to rotate relative to the positioning fixture and to lock with the positioning fixture at a desired inclination via the latch device;
a transmission element having first and second distal ends, wherein the second distal end is coupled with the latch device;
a safety latch key affixed with the movable frame and disposed adjacent to a release button; wherein
the release button is assembled with the second segment of the movable frame and coupled with the first distal end of the transmission element, wherein the release button is movable along a first axis for driving the latch device to unlock via the transmission element, and the release button is movable along a second axis different from the first axis for engaging the safety latch key with the release button, thereby blocking the release button from driving unlocking operation of the latch device.

10. The infant carrying apparatus according to claim 9, wherein the second axis is substantially perpendicular to the first axis.

11. The infant carrying apparatus according to claim 9, wherein the release button further comprises an operation part having a recess, and a housing is provided for movably assembling the release button with the second segment of the movable frame, the housing including an opening through which is passed the operation part, the opening having a first edge that engages with the recess of the operation part when the release button is engaged with the safety latch key.

12. The infant carrying apparatus according to claim 9, wherein the transmission element is assembled along an interior of the movable frame.

13. The infant carrying apparatus according to claim 9, wherein the release button further comprises a biasing slot, and a locking slot communicating with the biasing slot, wherein the first distal end of the transmission element is movably engaged with the biasing slot, and is displaced to engage with the locking slot when the safety latch key is engaged with the release button.

14. The infant carrying apparatus according to claim 13, wherein the biasing slot extends at an angle relative to the first axis.

15. The infant carrying apparatus according to claim 9, wherein the safety latch key is affixed with the second segment of the movable frame, the release button comprises a locking slot and is movable along the second axis relative to the safety latch key, wherein the safety latch key is engaged with the locking slot for blocking movement of the release button along the first axis.

16. The infant carrying apparatus according to claim 15, wherein the release button further comprises a guide slot extending parallel to the first axis, the guide slot communicating with the locking slot.

17. The infant carrying apparatus according to claim 15, wherein the release button is connected with a spring element that is operable to bias the release button toward a position engaging the safety latch key with the locking slot.

* * * * *